(12) United States Patent (10) Patent No.: US 12,695,300 B2

Chambon (45) Date of Patent: Jul. 28, 2026

(54) REDUNDANT POWER SUPPLY APPARATUS FOR MULTI-INPUT IT LOADS

(71) Applicant: SCHNEIDER ELECTRIC IT CORPORATION, Foxboro, MA (US)

(72) Inventor: Patrick Chambon, Saint Martin d'Hères (FR)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 18/787,188

(22) Filed: Jul. 29, 2024

(65) Prior Publication Data

US 2026/0031615 A1 Jan. 29, 2026

(51) Int. Cl.
| | |
|---|---|
| *H02J 1/10* | (2026.01) |
| *H02J 1/108* | (2026.01) |
| *G06F 1/26* | (2006.01) |
| *H02J 9/06* | (2006.01) |

(52) U.S. Cl.
CPC .............. *H02J 1/106* (2020.01); *H02J 1/108* (2013.01); *G06F 1/26* (2013.01); *H02J 9/061* (2013.01)

(58) Field of Classification Search
CPC ........ H02J 1/10–108; H02J 1/14; H02J 9/061; H02J 3/26; G06F 1/26–263
See application file for complete search history.

(56) References Cited

U.S. PATENT DOCUMENTS

| | | | | |
|---|---|---|---|---|
| 5,834,925 | A | * 11/1998 | Chesavage | .............. H02J 1/108 |
| | | | | 323/272 |
| 6,433,444 | B1 | * 8/2002 | de Vries | .................... H02J 9/00 |
| | | | | 307/64 |
| 8,929,106 | B2 | 1/2015 | Reddy et al. | |
| 9,385,597 | B2 | 7/2016 | Wang | |
| 9,762,086 | B1 | * 9/2017 | Ross | ......................... H02J 9/06 |
| 9,997,955 | B1 | * 6/2018 | Ross | ...................... H02J 1/108 |
| 10,756,543 | B2 | 8/2020 | Detmers et al. | |
| 11,853,088 | B2 | 12/2023 | Jenkins et al. | |
| 2005/0071092 | A1 | * 3/2005 | Farkas | ...................... G06F 1/26 |
| | | | | 702/60 |

(Continued)

FOREIGN PATENT DOCUMENTS

| | | |
|---|---|---|
| EP | 2415148 B1 | 8/2014 |
| EP | 4138246 A1 | 2/2023 |

*Primary Examiner* — Rexford N Barnie
*Assistant Examiner* — David A Shiao
(74) *Attorney, Agent, or Firm* — Kinney & Lange, P.A.

(57) ABSTRACT

A power system for a data center is presented, the power system including a first rack; a first power converter coupled to a first rack first input, the first power converter being configured to adjust a first output voltage of the first power converter based on a first portion of the first DC power; a second power converter coupled to a first rack second input, the second power converter being configured to provide second DC power to the first rack and to the second rack, the second power converter further being configured to adjust a second output voltage of the second power converter based on a first portion of the second DC power and a second portion of the second DC power; a first asymmetric-conductance device coupled between the first power converter and first rack; and a second asymmetric-conductance device coupled between the second power converter and first rack.

14 Claims, 13 Drawing Sheets

(56)  References Cited

U.S. PATENT DOCUMENTS

| 2006/0273740 | A1* | 12/2006 | Saeueng | H02J 1/102 |
| | | | | 315/291 |
| 2008/0309300 | A1 | 12/2008 | Liu et al. | |
| 2011/0006600 | A1* | 1/2011 | Fontana | H02J 1/10 |
| | | | | 361/679.01 |
| 2012/0013186 | A1* | 1/2012 | Sarti | G06F 1/30 |
| | | | | 307/23 |
| 2014/0268947 | A1* | 9/2014 | Phadke | H02J 1/102 |
| | | | | 363/69 |
| 2015/0076910 | A1* | 3/2015 | Wang | H02J 1/04 |
| | | | | 307/52 |
| 2016/0134108 | A1* | 5/2016 | Hung | H02J 1/102 |
| | | | | 307/60 |
| 2018/0090984 | A1* | 3/2018 | Ku | H02J 9/061 |
| 2020/0303922 | A1* | 9/2020 | Fukuhara | H02J 1/12 |
| 2021/0004029 | A1* | 1/2021 | Shirokov | H02J 1/12 |
| 2021/0135486 | A1* | 5/2021 | Liu | H02M 1/325 |
| 2023/0054222 | A1* | 2/2023 | Stokman | H02J 1/04 |
| 2023/0327434 | A1* | 10/2023 | Abe | H02J 3/381 |
| | | | | 363/65 |

* cited by examiner

400

402

| Sources | 1 | 2 | 3 | 4 |
|---|---|---|---|---|
| On/Off | On | On | On | On |
| Output Power Level (%): | 75 | 76 | 77 | 76 |
| Output Voltage: | 367 | 367 | 367 | 367 |

| Load | Load Utilization Level (%) |
|---|---|
| A | 100 |
| B | 100 |
| C | 100 |
| D | 100 |
| E | 100 |
| F | 100 |

404

500

502

| Sources | 1 | 2 | 3 | 4 |
|---|---|---|---|---|
| On/Off | On | On | On | On |
| Output Power Level (%): | 41 | 41 | 40 | 41 |
| Output Voltage: | 373 | 373 | 373 | 373 |

| Load | Load Utilization Level (%) |
|---|---|
| A | 85 |
| B | 10 |
| C | 70 |
| D | 45 |
| E | 22 |
| F | 80 |

504

600

602

| Sources | 1 | 2 | 3 | 4 |
|---|---|---|---|---|
| On/Off | On | On | On | On |
| Output Power Level (%): | 31 | 32 | 1 | 30 |
| Output Voltage: | 375 | 374 | 380 | 375 |

| Load | Load Utilization Level (%) |
|---|---|
| A | 100 |
| B | 0 |
| C | 30 |
| D | 0 |
| E | 60 |
| F | 0 |

604

700

702

| Sources | 1 | 2 | 3 | 4 |
|---|---|---|---|---|
| On/Off | On | On | On | Off |
| Output Power Level (%): | 101 | 101 | 101 | 0 |
| Output Voltage: | 362 | 362 | 362 | 0 |

| Load | Load Utilization Level (%) |
|---|---|
| A | 100 |
| B | 100 |
| C | 100 |
| D | 100 |
| E | 100 |
| F | 100 |

704

800

802

| Sources | 1 | 2 | 3 | 4 |
|---|---|---|---|---|
| On/Off | On | On | On | Off |
| Output Power Level (%): | 55 | 50 | 50 | 0 |
| Output Voltage: | 370 | 371 | 371 | 0 |

| Load | Load Utilization Level (%) |
|---|---|
| A | 65 |
| B | 75 |
| C | 80 |
| D | 35 |
| E | 25 |
| F | 25 |

804

900

902

| Sources | 1 | 2 | 3 | 4 |
|---|---|---|---|---|
| On/Off | Off | On | On | Off |
| Output Power Level (%): | 0 | 103 | 96 | 0 |
| Output Voltage: | 0 | 362 | 363 | 0 |

| Load | Load Utilization Level (%) |
|---|---|
| A | 90 |
| B | 90 |
| C | 90 (Off) |
| D | 90 |
| E | 90 |
| F | 25 |

904

1100

Provide First Output Voltage — 1102

Provide Second Output Voltage — 1104

Power Balanced? — 1106

YES

NO

Scale Output Voltages — 1108

REDUNDANT POWER SUPPLY APPARATUS FOR MULTI-INPUT IT LOADS

BACKGROUND

1. Field of the Disclosure

At least one example in accordance with the present disclosure relates generally to power systems for providing balanced and/or redundant power in a datacenter or similar environment.

2. Discussion of Related Art

Datacenters may house multiple servers or other types of computer systems. These systems may require constant or variable amounts of power depending on their respective load levels.

SUMMARY

According to at least one aspect of the present disclosure a power system for a data center is provided, the power system comprising: a first rack having a first rack first input and a first rack second input; a first power converter coupled to the first rack first input and configured to provide first DC power to the first rack, the first power converter being configured to adjust a first output voltage of the first power converter based at least in part on a first portion of the first DC power associated with the first rack first input; a second power converter coupled to the first rack second input and configured to be coupled to a second rack, the second power converter being configured to provide second DC power to the first rack and to the second rack, the second power converter further being configured to adjust a second output voltage of the second power converter based at least in part on a first portion of the second DC power associated with the first rack second input and a second portion of the second DC power associated with the second rack; a first asymmetric-conductance device coupled between the first power converter and the first rack; and a second asymmetric-conductance device coupled between the second power converter and the first rack.

In some examples, the power system further comprises a first droop controller coupled to the first power converter and a second droop controller coupled to the second power converter. In some examples, the first droop controller is configured to control the first power converter to adjust the first output voltage based at least in part on the first portion of the first DC power. In some examples, the first droop controller is configured to control the first power converter to adjust the first DC power based on the first output voltage. In some examples, the first droop controller is configured to control the first power converter to reduce the first output voltage as the first DC power increases and to increase the first output voltage as the first DC power decreases. In some examples, the second droop controller is configured to control the second power converter to adjust the second output voltage based at least in part on the first portion of the second DC power. In some examples, the second droop controller is configured to control the second power converter to adjust the second DC power based on the second output voltage. In some examples, the second droop controller is configured to control the second power converter to reduce the second output voltage as the second DC power increases and to increase the second output voltage as the second DC power decreases. In some examples, the power system further comprises the second rack, the second rack including a second rack first input and a second rack second input. In some examples, the power system further comprises a third power converter coupled to the second rack and configured to provide third DC power to the second rack, the third power converter being configured to adjust a third output voltage of the third power converter based at least in part on a first portion of the third DC power associated with the second rack second input; a third asymmetric-conductance device coupled between the second power converter and the second rack; and a fourth asymmetric-conductance device coupled between the third power converter and the second rack, wherein the second rack includes a second rack first input and a second rack second input and the second power converter is configured to adjust the second output voltage based at least in part on the second portion of the second DC power, the second portion of the second DC power being associated with the second rack first input. In some examples, the third power converter includes a third droop controller configured to control the third power converter to reduce the third output voltage as the third DC power increases and to increase the third output voltage as the third DC power decreases. In some examples, each rack includes a plurality of subracks coupled in parallel with one another relative to a power converter.

According to at least one aspect of the present disclosure, a method of providing redundant power to one or more loads in a data center and balancing power between power sources providing the redundant power is presented, comprising: providing a first portion of first DC power from a first power converter to a first load via a first asymmetric-conducting device coupled to a first load first input; providing a first portion of second DC power from a second power converter to the first load via a second asymmetric conducting device coupled to a first load second input; based on the first DC power, adjusting a first output voltage of the first power converter by decreasing the first output voltage as the first DC power increases; based on the second DC power, adjusting a second output voltage of the second power converter by decreasing the second output voltage as the second DC power increases.

In some examples, the method further comprises providing a second portion of the second DC power from the second power converter to a second load via a third asymmetric conducting device coupled to a second load first input; providing a first portion of third DC power from a third power converter to the second load via a fourth asymmetric conducting device coupled to a second load second input; and based on the third DC power, adjusting a third output voltage of the third power converter by decreasing the third voltage as the third DC power increases. In some examples, the method further comprises providing the first DC power, second DC power, and third DC power such that the amount of DC power provided by the first power converter, second power converter, and third power converter is balanced. In some examples, the method further comprises controlling the first output voltage using a first droop controller, and controlling the second output voltage using a second droop controller.

According to at least one aspect of the present disclosure, one or more non-transitory computer-readable media are presented, the non-transitory computer-readable media containing thereon instructions for instructing one or more droop controllers, the instructions instructing: a first droop controller to control a first DC power converter to output a first output voltage, determine a first DC power associated with the first output voltage and a first rack, responsive to determining the first DC power, providing the first DC power to the first rack via a first asymmetric conductive device, and responsive to the first DC power increasing, decreasing the first output voltage; a second droop controller to control a second DC power converter to output a second output voltage, determine a second DC power associated with the second voltage and the first rack, responsive to determining the second DC power, providing the second DC power to the first rack via a second asymmetric conductive device, and responsive to the second DC power increasing, decreasing the second output voltage.

In some examples, the instructions further instruct a third droop controller to control a third DC power converter to output a third output voltage, determine a third DC power associated with the third voltage and a second rack, responsive to determining the third DC power, providing the third DC power to the second rack via a third asymmetric conductive device, and responsive to the third DC power increasing, decreasing the third output voltage. In some examples, the instructions further instruct the second droop controller to determine a second portion of the second DC power associated with the second output voltage and a second rack, responsive to determining the second portion of the second DC power, providing the second portion of the second DC power to the second rack via a third asymmetric conductive device, and responsive to the second DC power increasing, decreasing the second output voltage. In some examples, the first DC power is provided to a first input of the first rack and the second DC power is provided to a second input of the first rack and wherein the first DC power decreases as the second DC power increases, and the second DC power decreases as the first DC power increases.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Datacenters may contain numerous loads that use power. These loads may include servers, server racks, computer systems, routers (and similar switching devices), and so forth. In examples discussed herein, the various loads may require different amounts of power, and/or the amount of power required by the respective loads may vary over time depending on factors such as load utilization. However, a given power source may not be able to provide sufficient power for every load, or may not be coupled to every load. Likewise, when multiple power sources are coupled to a given load (or loads), the power sources may be configured to provide balanced power to the loads. Balanced power does not necessarily mean each power source is providing the same amount of power to a given load. Rather, in some examples, it means the power drawn from the power sources is distributed to the loads in a way such that each load receives adequate power without any one power source being under undue load.

Examples of power systems discussed herein include power sources with droop controllers that are configured to automatically adjust the output voltage of the power sources. The power sources may be coupled to loads, such as server racks, and each load may be coupled to two or more power sources. As a given load may draw power from two or more power sources, the load may be equipped with diodes (or other asymmetric conductive devices) so that current (and therefore power) derived from one power source cannot be provided to the input of another power source. The given load may receive power from two or more power sources simultaneously. For example, a given load may receive X % (where X is a number between 0 and 100) of its power from a first power source, and (100−X) % from a second power source. The amount of power received from a given power source may change dynamically depending on the load utilization of the loads to which a given power source is connected. Thus, in the example above, if the power source providing X % of the power to the load is no longer able to provide X % of the power, but now provides Y % of the power (where Y is less than X), then the second power source may automatically provide additional power to make up for the reduction in power provided by the first power source. In systems with multiple power sources and multiple loads, the principles described above can be expanded for any arbitrary number of loads and/or power sources, as will be discussed in greater detail below.

Figure 1:
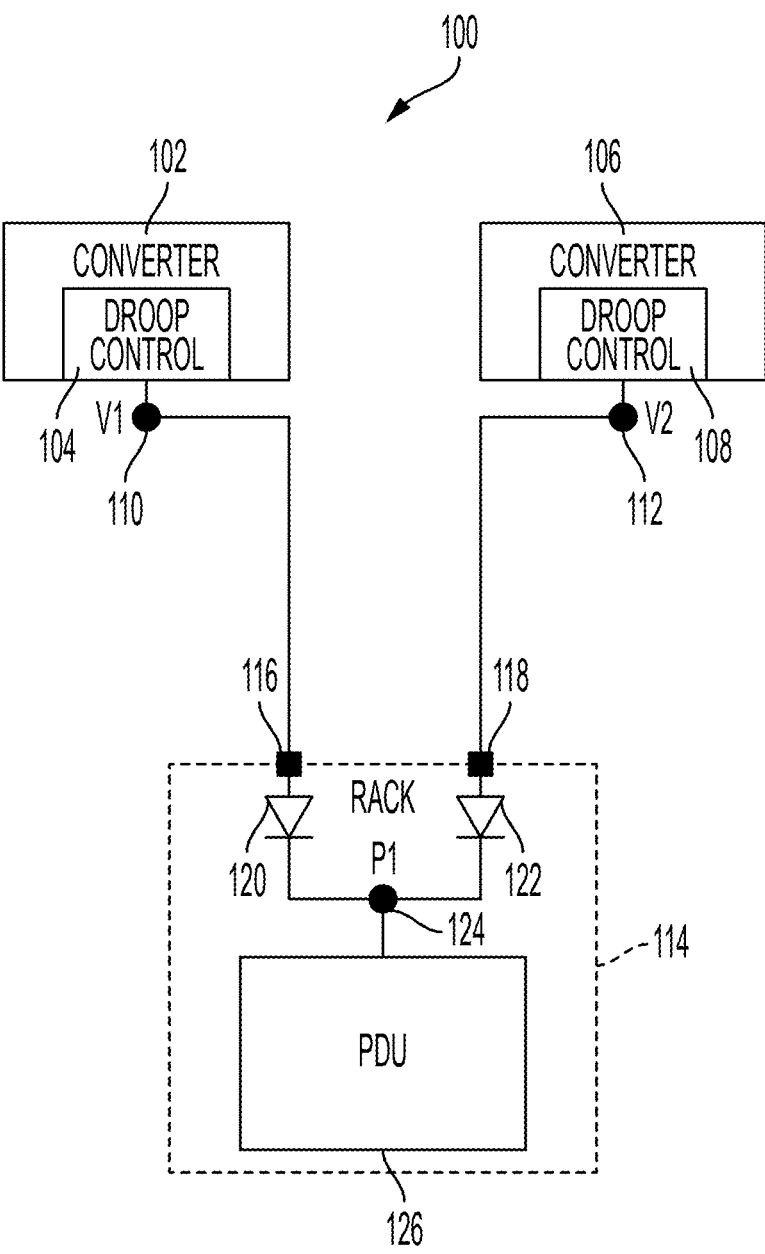
FIG. 1 illustrates a power system according to an example.

FIG. 1 illustrates a power system 100 for providing balanced power to one or more loads according to an example. The power system 100 includes a first power converter 102 ("first converter 102"), a first droop controller 104, a second power converter 106 ("second converter 106"), a second droop controller 108, a first node 110, a second node 112, a server rack 114 ("rack 114"), a first input 116, a second input 118, a first asymmetric conducting device 120 ("first diode 120"), a second asymmetric conducting device 122 ("second diode 122"), a third node 124, and a power distribution unit 126 ("PDU 126").

The power system 100 is configured to provide balanced power to the rack 114 from the first converter 102 and second converter 106. In some examples, the first droop controller 104 may adjust the output voltage of the first converter 102 based on the power drawn from the first converter 102, and the second droop controller 108 of the second converter 106 may adjust the output voltage of the second converter 106 based on the power drawn from the second converter 106. By adjusting the output voltages, the first droop controller 104 and second droop controller 108 may control the amount of power provided by their respective power converters so that when one power converter (for example, the first converter 102) cannot provide as much power, the other power converter (for example, the second converter 106) can then provide additional power.

The first converter 102 includes the first droop controller 104. The first converter 102 and/or the first droop controller 104 are coupled to the first node 110. The second converter 106 includes the second droop controller 108. The second converter 106 and/or second droop controller 108 are coupled to the second node 112. The first node 110 is coupled to the first input 116, and the second node 112 is coupled to the second input 118.

The rack 114 includes the first input 116, second input 118, first diode 120, second diode 122, third node 124, and the PDU 126. The first input 116 is coupled to the first diode 120. In some examples, the first input 116 is coupled to an anode of the first diode 120. The first diode 120 is coupled to the third node 124. In some examples, a cathode of the first diode 120 is coupled to the third node 124. The second input 118 is coupled to the second diode 122. In some examples, the second input 118 is coupled to an anode of the second diode 122. The second diode 122 is coupled to the third node 124. In some examples, a cathode of the second diode 122 is coupled to the third node 124. The third node 124 is coupled to the PDU 126. In some examples, the third node 124 is coupled to a first input of the PDU 126.

The first converter 102 is configured to provide a first output voltage to the first node 110. In FIG. 1, "V1" denotes the first output voltage. The first converter 102 may provide DC power to the rack 114 and/or first node 110. In some examples, the first converter 102 may be able to convert from multiple types of power to one or more types of power, including DC power. For example, the first converter may combine the functionality of an AC/DC and/or a DC/DC power converter, and thus may be able to convert AC power to DC power or DC power to DC power.

The first droop controller 104 is configured to control the first output voltage. The first droop controller 104 may increase or decrease the first output voltage either by controlling the first converter 102 to change the first output voltage or by directly changing the first output voltage. The first droop controller 104 may control the first output voltage based on power drawn by the rack 114 that is derived from the first converter 102. In some examples, the power drawn by the rack 114 that is derived from the first converter 102 is the power measured or sensed at the first node 110, denoted by "V1" in FIG. 1 and/or the power sensed at the first input 116. In some examples, the first droop controller 104 may control the first output voltage based on the output power level of the first converter 102. In some examples, the first droop controller 104 may directly measure the output power level of the first converter 102.

The second converter 106 is configured to provide a second output voltage to the second node 112. In FIG. 1, "V2" denotes the second output voltage. The second converter 106 may provide DC power to the rack 114 and/or second node 112. In some examples, the second converter 106 may be able to convert from multiple types of power to one or more types of power, including DC power. For example, the first converter may combine the functionality of an AC/DC and/or a DC/DC power converter, and thus may be able to convert AC power to DC power or DC power to DC power The second droop controller 108 is configured to control the second output voltage. The second droop controller 108 may increase or decrease the second output voltage either by controlling the second converter 106 to change the second output voltage or by directly changing the second output voltage. The second droop controller 108 may control the second output voltage based on power drawn by the rack 114 that is derived from the second converter 106. In some examples, the power drawn by the rack 114 that is derived from the second converter 106 is the power measured or sensed at the second node 112, denoted by "V2" in FIG. 1 and/or the power sensed at the second input 118. In some examples, the second droop controller 108 may control the second output voltage based on the output power level of the second converter 106. In some examples, the second droop controller 108 may directly measure the output power level of the second converter 106.

The first converter 102 may provide X % of the total power provided to the rack 114, while the second converter 106 may provide Y % of the total power provided to the rack 114, where both X and Y are numbers between 0 and 100. In some examples, Y may be equal to 100-X. Each converter provides an output voltage, V1 or V2. In some examples, the first droop controller 104 may initially provide a high first output voltage, and as output power of the first converter 102 approaches 100% (for example, as the first converter 102 reaches full load utilization), the first droop controller 104 may cause the first output voltage to drop to a lower first output voltage relative to the initial, high first output voltage. The second droop controller 108 may similarly cause the second output voltage to drop to a lower voltage as the output power of the second converter 106 reaches 100%. Either or both of the first droop controller 104 and second droop controller 108 may have a voltage droop characteristic curve ("droop characteristic curve"), which may be a curve showing the change in output voltage as output power varies. In some examples, either or both of the first droop controller 104 and/or second droop controller 108 may use a power droop control scheme (for example, in lieu of a voltage droop control scheme). Power droop may be curve that changes the output power as the voltage varies and each or both controllers 104, 108 may have a power droop curve showing the change in output power as output voltage varies.

As will be discussed in greater detail below, the output power of a given power converter may depend on the power drawn by the rack 114 and its associated loads. As a result, if a given power converter is coupled to more than one rack 114, the output power of the power converter may depend on the power consumed by the racks to which the power converter is coupled.

The rack 114 may be any type of server rack, computer system, or other type of electronic load, and may be situated in a datacenter or similar space. The rack 114 may hold numerous servers or other computers, and may include a PDU 126. The PDU 126 may be configured to distribute power received from the first converter 102 and/or second converter 106 to the various servers within the rack 114. The rack 114 may have a first input 116 and a second input 118. The first input 116 may be configured to receive the first output voltage (V1) of the first converter 102, and the second input 118 may be configured to receive the second output voltage (V2) of the second converter 106.

The first diode 120 is an asymmetric conducting device that may be a diode or any other type of asymmetric conducting device. An asymmetric conducting device is a device, like a diode, that permits current in one direction but not in the reverse direction (subject to breakdown voltage). The first diode 120 permits current to pass from the first converter 102 to the PDU 126, but prevents current from passing from the PDU 126 to the first converter 102. The second diode 122 is similar to the first diode 120 in that it is also an asymmetric conducting device. The second diode 122 permits current to pass from the second converter 106 to the PDU 126, but prevents current from passing from the PDU 126 to the second converter 106. As a result, should the first converter 102 or second converter 106 provide excess power and/or current for a period of time, the first diode 120 and the second diode 122 prevent the first converter 102 and/or second converter 106 from receiving a feedback current corresponding to the excess power and/or current.

The PDU 126 may be a power distribution unit, such as a power strip or any other device for distributing power to the servers or other loads within the rack 114, or a power supply unit (PSU), or other power distribution device. The PDU 126 receives the power from the first converter 102 and second converter 106 and distributes that power to the loads. The PDU 126 may have internal functionality such as internal switches, transformers, or other converters, or may be as simple as a bus connecting the loads to the power sources, such as the first converter 102 and second converter 106.

Figure 2:
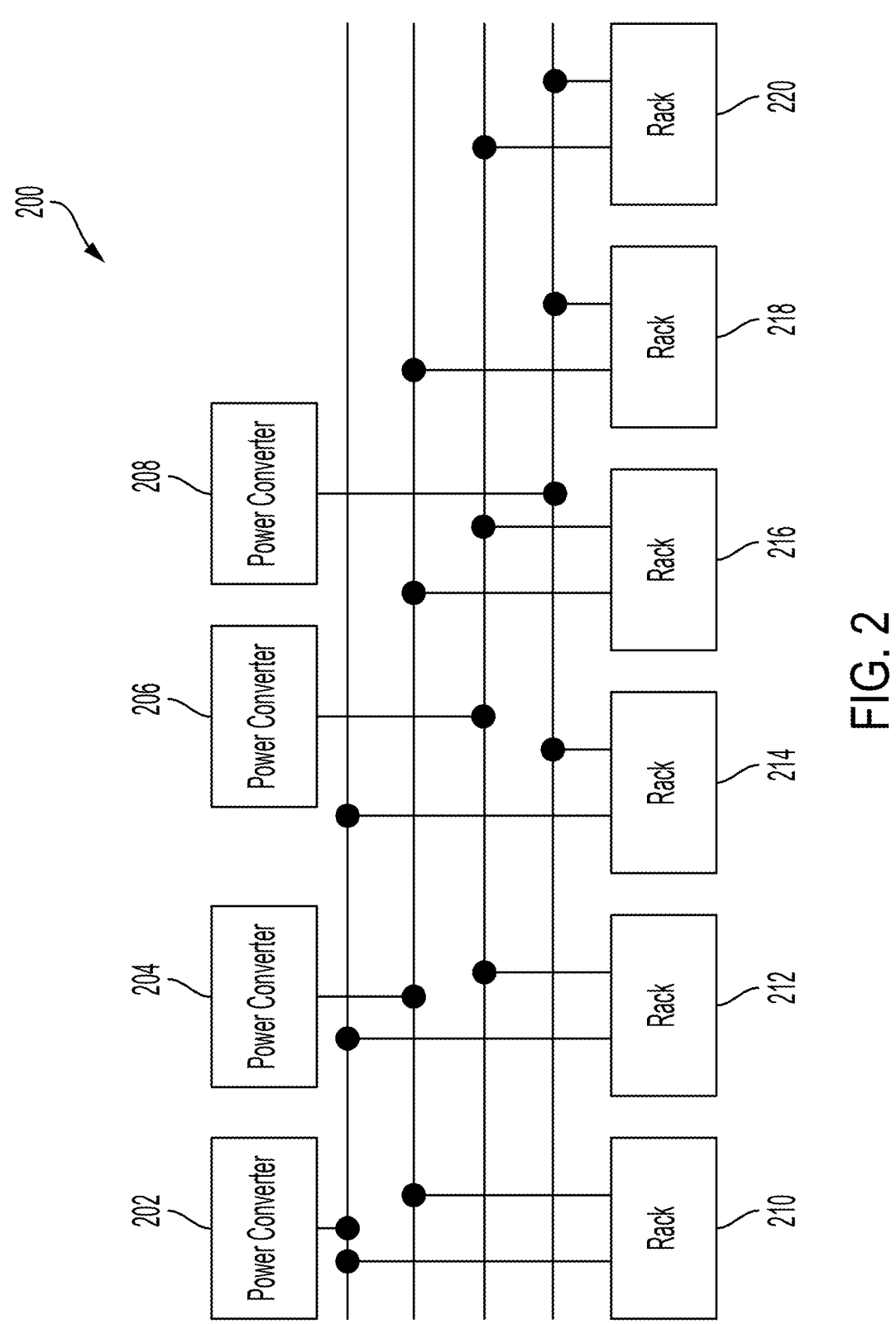
FIG. 2 illustrates a power system according to an example.

FIG. 2 illustrates a power system 200 according to an example. The power system 200 is configured to provide balanced power and redundant power to one or more loads. The power system 200 may be configured similarly to the power system 100 of FIG. 1, and may, in some examples, be an extension of the power system 100 of FIG. 1 to encompass multiple racks and more than two power converters. The power system 200 facilitates a high level of redundancy, such that if one or more of the power converters 202, 204, 206, 208 of the power system 200 fail, all of the racks 210, 212, 214, 216, 218, 220 may remain powered.

The power system 200 includes a first power converter 202, a second power converter 204, a third power converter 206, a fourth power converter 208, a first rack 210, a second rack 212, a third rack 214, a fourth rack 216, a fifth rack 218, and a sixth rack 220. The number of power converters may be arbitrary, so the four power converters of FIG. 2 are only one example. Likewise, the number of racks may be arbitrary. Finally, there may be more power converters than racks, the same number of power converters and racks, or more racks than power converters.

An output of the first power converter 202 is coupled to a first input of the first rack 210, a first input of the second rack 212, and a first input of the third rack 214. An output of the second power converter 204 is coupled to a second input of the first rack 210, a first input of the fourth rack 216, and a first input of the fifth rack 218. An output of the third power converter 206 is coupled to a second input of the second rack 212, a second input of the fourth rack 216, and a first input of the sixth rack 220. An output of the fourth power converter 208 is coupled to a second input of the third rack 214, a second input of the fifth rack 218, and a second input of the sixth rack 220.

The first power converter 202 is configured to provide first output power to the first rack 210, second rack 212, and third rack 214. The second power converter 204 is configured to provide second output power to the first rack 210, fourth rack 216, and fifth rack 218. The third power converter 206 is configured to provide third output power to the second rack 212, the fourth rack 216, and the sixth rack 220. The fourth power converter 208 is configured to provide fourth output power to the third rack 214, fifth rack 218, and the sixth rack 220.

Each of the first power converter 202, second power converter 204, third power converter 206, and/or fourth power converter 208 may include a respective droop controller (such as the first droop controller 104 of FIG. 1). The droop controller may be configured to reduce the output voltage of the output power based on the level of the output power.

For example, the first power converter 202 may be configured to provide a maximum of 50 kilowatts (kW) of power per unit of time. At an output power level of 100%, the first power converter 202 may be providing 50 kW of first output power per unit time to the racks to which the first power converter 202 is providing power to. At an output power level of 50%, the first power converter 202 may be providing 25 kW of first output power per unit time, and so forth, with a 0% power level indicating the first power converter 202 is providing no or virtually no first output power. As the level of first output power increases from 0% to 100%, the droop controller for the first power converter 202 may reduce the output voltage corresponding to the first output power according to a droop characteristic curve. Each of the other respective droop controllers may be configured in a similar way with their own respective droop characteristic curves (which may all be identical, some be identical, or all be different).

At various times, as discussed in greater detail below with respect to FIGS. 4-9, a given rack or power converter may be offline, functioning sub-optimally, or drawing relatively less power, thereby freeing up power in the power system 200 (in the case of a rack being offline or drawing less power), or reducing available power in the power system 200 (in the case of a power converter being offline or a power converter functioning sub-optimally). As a result, the power being derived from a given power converter can fluctuate as a given power converter may need to provide more power in response to a rack using more power or another power converter providing less power.

For example, the first power converter 202 is coupled to the first rack 210, second rack 212, and third rack 214, and provides first output power (having a first output voltage) to each of those racks. The second power converter 204 is coupled to the first rack 210 and provides second output power having a second output voltage to the first rack 210. If the second power converter 204 goes offline or suffers some error that reduces the second output power level, the first power converter 202 may need to provide additional first output power to account for the loss of the second power converter 204. As a result, the first power converter 202 may be able to provide less first output power to the second rack 212 and/or third rack 214. This, in turn, may cause the third power converter 206 to provide more third output power to the second rack 212, and the fourth power converter 208 to provide more fourth output power to the third rack 214. However, the amount of third and fourth output power may thereby change, resulting in further changes in the proportion of power provided by given power converters to given racks.

However, with the droop controller providing droop control, the power system 200 can automatically balance power output such that the total output power level of each power converter is approximately the same. FIGS. 4-9 discuss this further.

While the case given above is illustrative, racks may be under variable levels of load utilization (e.g., there is a range of power consumption possible between "off" and full power states for a given rack). Furthermore, rack load utilization may vary over time. Thus, the proportions of first output power, second output power, and third output power spread between the racks may change at regular intervals, or at irregular intervals. The droop controllers incorporated into the power converters (or associated with the power converters) may automatically adjust the output voltages corresponding to the first, second, third, and/or fourth output power based on the droop characteristic curve.

Figure 3:
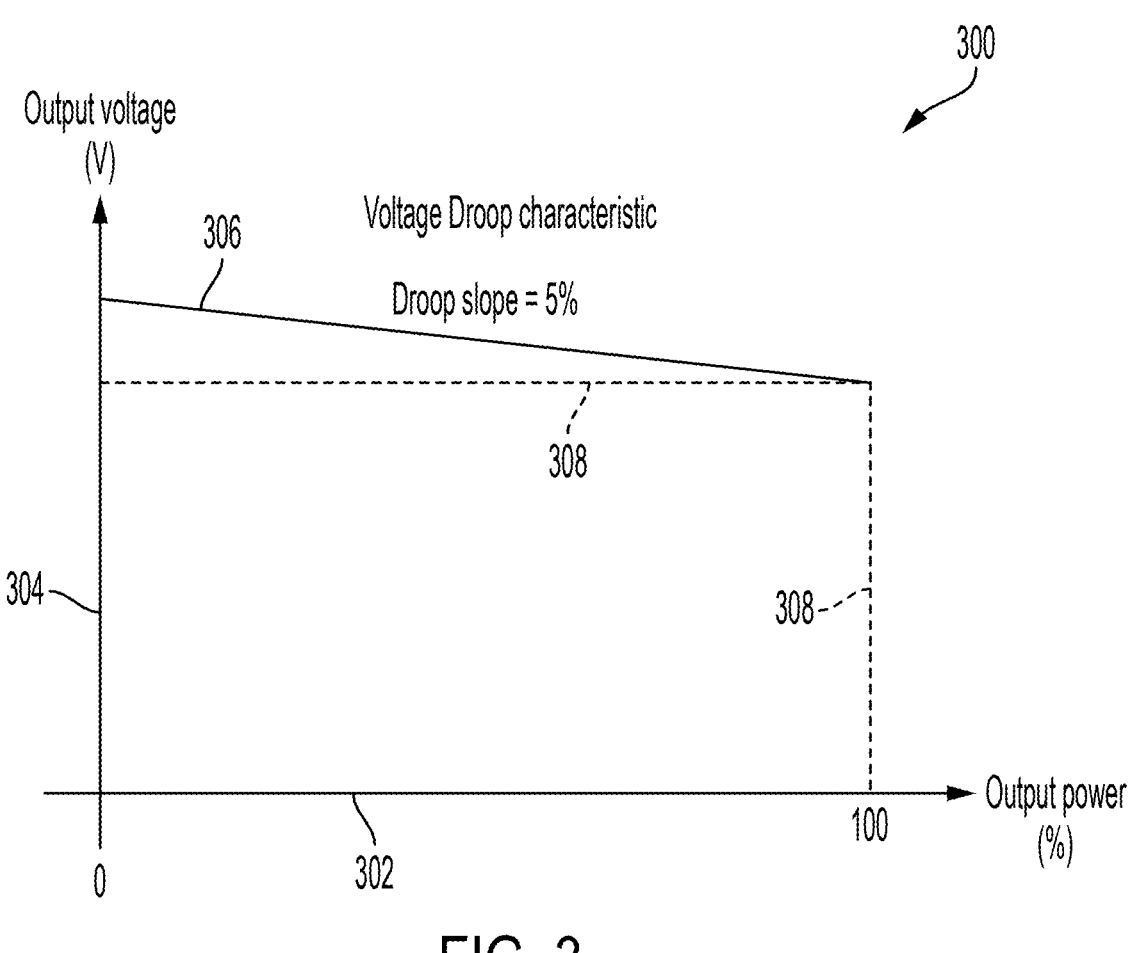
FIG. 3 illustrates a graph according to an example.

FIG. 3 illustrates a graph 300 of a droop characteristic curve according to an example. The graph 300 includes a first axis 302, a second axis 304, a first trace 306, and a second trace 308.

The first axis 302 represents the output power of a power converter, such as the first converter 102 of FIG. 1, or other power source as a percentage, starting at 0% and proceeding upward to 100% or higher.

The second axis 304 represents the output voltage between 0 volts (V) and 380V.

The first trace 306 represents the droop characteristic curve for a droop controller, such as the first droop controller 104 of FIG. 1.

The second trace 308 indicates the intersection between 100% output power (of the power converter) and the output voltage (of the power converter) corresponding to 100% output power. In this example, 100% output power is reached at an output voltage of 361V.

In this example, when the power converter is providing relatively little or approximately no power, the output voltage may be 380V, as indicated by the first trace 306. As the output power of the power converter increases, the droop controller manages the output voltage, causing it to fall. In this example, the droop characteristic curve is linear and has a slope of 5%. That is, as output power increases from 0% to 100%, the output voltage drops 5%. So, for example, while at 50% output power the output voltage would drop by 2.5%, while at 90% output power the output voltage would drop by 4.5%, and so forth. Hence the output voltage of 361V at 100% output power, which is 95% of the maximum 380V shown in the graph 300.

While the shown droop characteristic curve is linear, the droop characteristic curve does not need to be linear. Likewise, while the shown droop slope is 5%, it can be any value. In some examples, the droop slope may be between 0% and 10%.

As a result, when a droop controller is controlling the output voltage of a power converter, the droop controller can reduce the output voltage as the output power approaches 100%, and can increase the output voltage when the output power approaches 0%.

When multiple power converters are coupled to a single load, as with the first power converter 202, second power converter 204, and first rack 210 of FIG. 2, the droop controller for the first power converter 202 and the droop controller for the second power converter 204 can scale the output power provided by the two power converters so that all necessary power is available to the first rack 210 while also ensuring that power is shared between both power converters.

When a power converter is coupled to multiple loads, and those loads are also coupled to other power converters (for example, as shown in FIG. 2), the droop controllers associated with those power converters will automatically adjust the output voltages of the power converters as the share of power between the loads (and thus the proportions of power sourced from any given power converter to any given load) change. This can have the effect of automatically balancing power output as load utilization and power output levels change.

Figure 4:
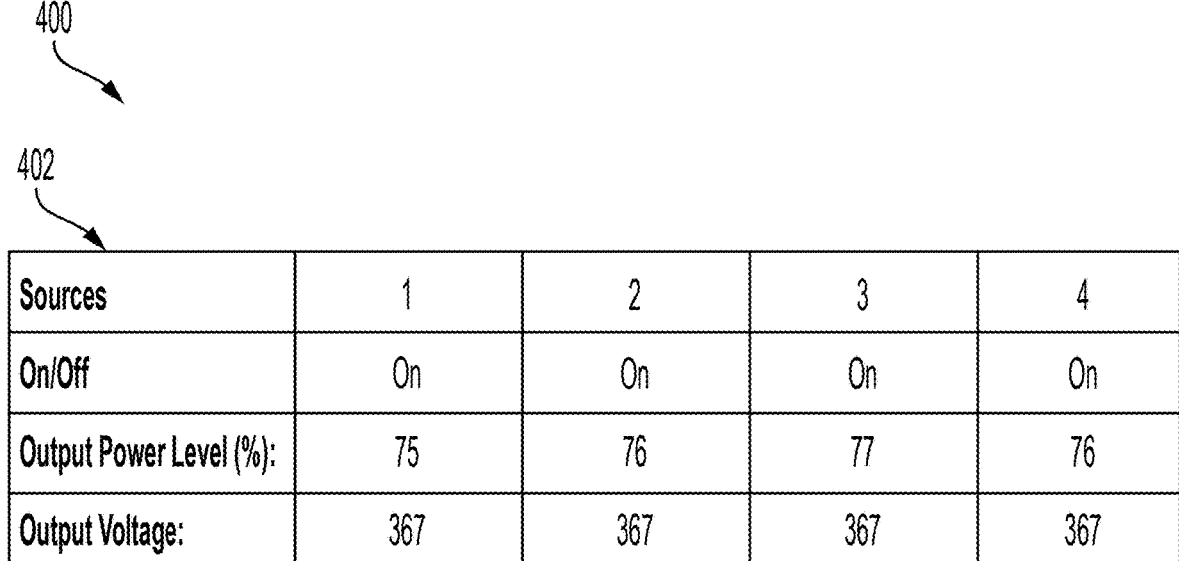
FIG. 4 illustrates a set of tables according to an example.

FIG. 4 illustrates a set of tables 400 ("tables 400") showing the effect of droop control and the redundant power coupling on a power system having four power sources and six loads according to an example. For example, the power system being described by FIG. 4 may be the power system 200 of FIG. 2. It will be appreciated that, although tables 400 describe a power system with four power source and six loads, the number of power sources and loads may be arbitrarily large. The tables 400 include a first table 402 and a second table 404.

The first table 402 includes four rows labeled "Sources," "On/Off," "Output Power Level (%)," and "Output Voltage." The "Sources" row indicates the source (between "1" and "4"), the "On/Off" row indicates whether the corresponding source is on or off, the "Output Power Level (%)" row indicates the percentage of output power being provided by the corresponding source, and the "Output Voltage" row indicates the output voltage, in volts, of the corresponding source. The sources may be, for example, power converters such as this discussed herein. In some examples, the sources correspond to the power converters of FIG. 2 (for example, source 1 is the first power converter 202, source 2 is the second power converter 204, source 3 is the third power converter 206, and source 4 is the fourth power converter 208).

The second table 404 has two columns labeled "Load" and "Load Utilization Level (%)" respectively. The "Load" column indicates the relevant load of the six loads, with the loads labeled "A" through "F." The "Load Utilization Level (%)" column indicates how much of the maximum power the load can use is being used. That is, 100% indicates the load is under full utilization, 50% indicates the load is under half utilization, 0% indicates the load is off, and so forth. In some examples, the loads correspond to the racks of FIG. 2 (for example, load A is the first rack 210, load B is the second rack 212, load C is the third rack 214, load D is the fourth rack 216, load E is the fifth rack 218, and load F is the sixth rack 220).

As can be seen, each of loads A through F are at 100% utilization. Each of the sources 1 through 4 are on. Under simulated conditions, including slight differences due to imbalances in cable lengths between sources and loads, the source 1 operates at 75% output power, sources 2 and 3 operate at 76% output power, and source 3 operates at 77% output power. Each source has an output voltage of 367V (out of 380V, corresponding to the maximum of 380V in the graph 300 of FIG. 4). The power sources 1-4 have roughly equal output power levels, and are therefore providing power in a balanced manner.

Figure 5:
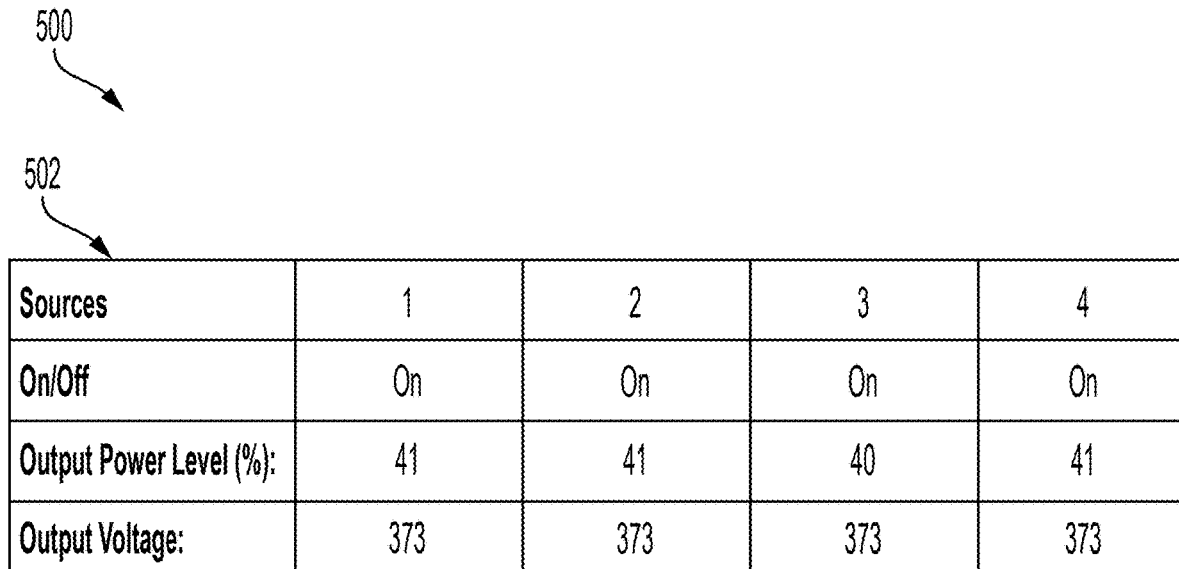
FIG. 5 illustrates a set of tables according to an example.

FIG. 5 illustrates a set of tables 500 ("tables 500") including a first table 502 and a second table 504. The first table 502 has the same rows (Sources, On/Off, Output Power Leve, Output Voltage) as the first table 402 of FIG. 4, and the second table 504 has the same columns (Load, Load Utilization Level) as the second table 404 of FIG. 4. The sources and loads may also correspond to the same things in FIG. 2 as they do in FIG. 4.

In the first table 502, each of sources 1-4 is on. Each of sources 1-4 have an output voltage of 373V. Sources 1, 2 and 4 have output power levels of 41%, and source 3 has an output power level of 40%. Each of the loads A-F is on, but each has a different load utilization level. Load A has a load utilization level of 85%, load B has a load utilization level of 10%, load C has a load utilization level of 70%, load D has a load utilization level of 45%, load E has a load utilization level of 22%, and load F has a load utilization level of 80%.

FIG. 5 therefore shows that even when different loads are drawing vastly different amounts of power, the output power level for the power sources can still be balanced by the power system (for example, power system 200 of FIG. 2).

Figure 6:
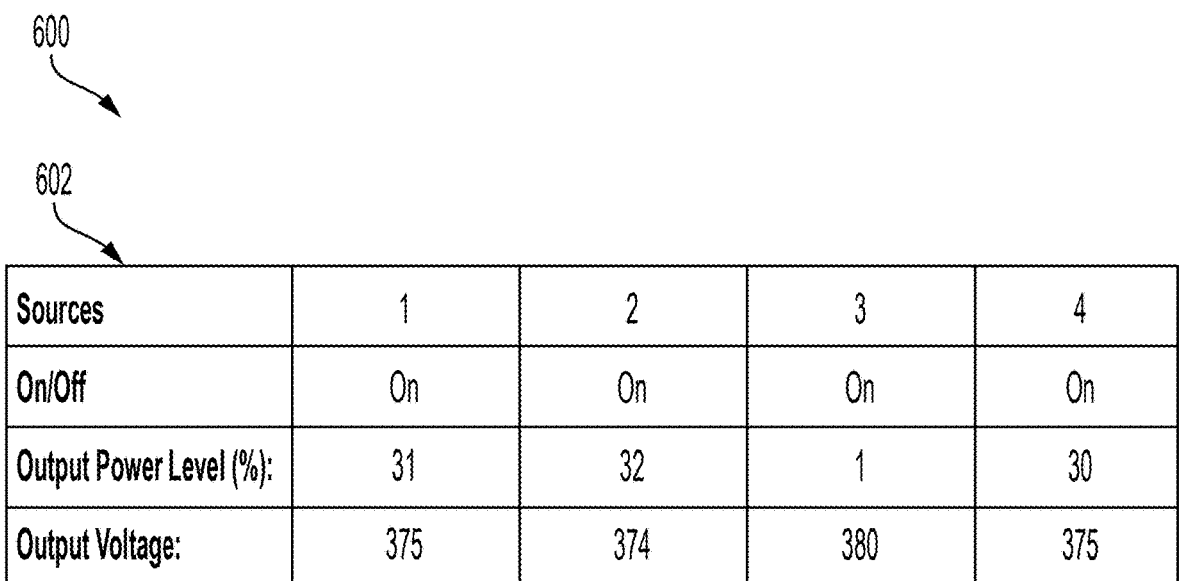
FIG. 6 illustrates a set of tables according to an example.

FIG. 6 illustrates a set of tables 600 ("tables 600") including a first table 602 and a second table 604. The first table 602 has the same rows (Sources, On/Off, Output Power Leve, Output Voltage) as the first table 402 of FIG. 4, and the second table 604 has the same columns (Load, Load Utilization Level) as the second table 404 of FIG. 4. The sources and loads may also correspond to the same things in FIG. 2 as they do in FIG. 4.

In the first table 602, each power source is on. In the second table 604, loads B, D, and F are not utilizing any power, while load A is at 100% utilization, load E is at 60% utilization, and load C is at 30% utilization. As a result, power source 3 has an output power level of approximately 1% and an output voltage of approximately 380V since none of the loads to which power source 3 is coupled are utilizing power. Power source 1 has 31% output power at 375V, power source 2 has 32% output power at 374V, and power source 4 has 40% output power at 375V. This demonstrates that even when multiple loads are off, such that a given power source is not coupled to any loads presently drawing power, the power system (for example, power system 200 of FIG. 2) can still balance the output power levels between the power sources.

Figure 7:
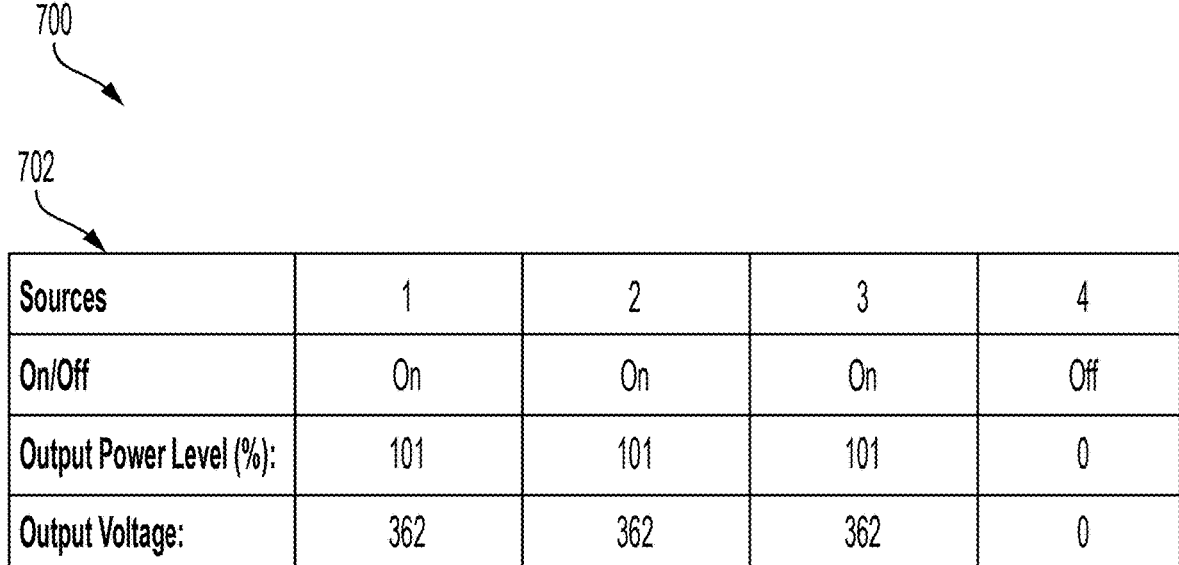
FIG. 7 illustrates a set of tables according to an example.

FIG. 7 illustrates a set of tables 700 ("tables 700") including a first table 702 and a second table 704. The first table 702 has the same rows (Sources, On/Off, Output Power Leve, Output Voltage) as the first table 402 of FIG. 4, and the second table 704 has the same columns (Load, Load Utilization Level) as the second table 404 of FIG. 4. The sources and loads may also correspond to the same things in FIG. 2 as they do in FIG. 4.

According to the first table 702, power source 4 is off and thus has an output power level of 0% and an output voltage of 0V. Power sources 1-3 are on and each has an output power level of 101% and an output voltage of 362V. According to the second table 704, each load is at 100% utilization. This demonstrates that even when a power source is off, the power system (for example, power system 200 of FIG. 2) can balance the output power level (and loading) between the power sources that are on. This illustrates the built-in redundancy of the power system (for example, power system 200 of FIG. 2). In general, for all cases where only one power source (for example, a power converter) is offline, all the loads, including those coupled to the offline power supply, are still supplied with power and the power being supplied remains balanced between the power supplies.

Figure 8:
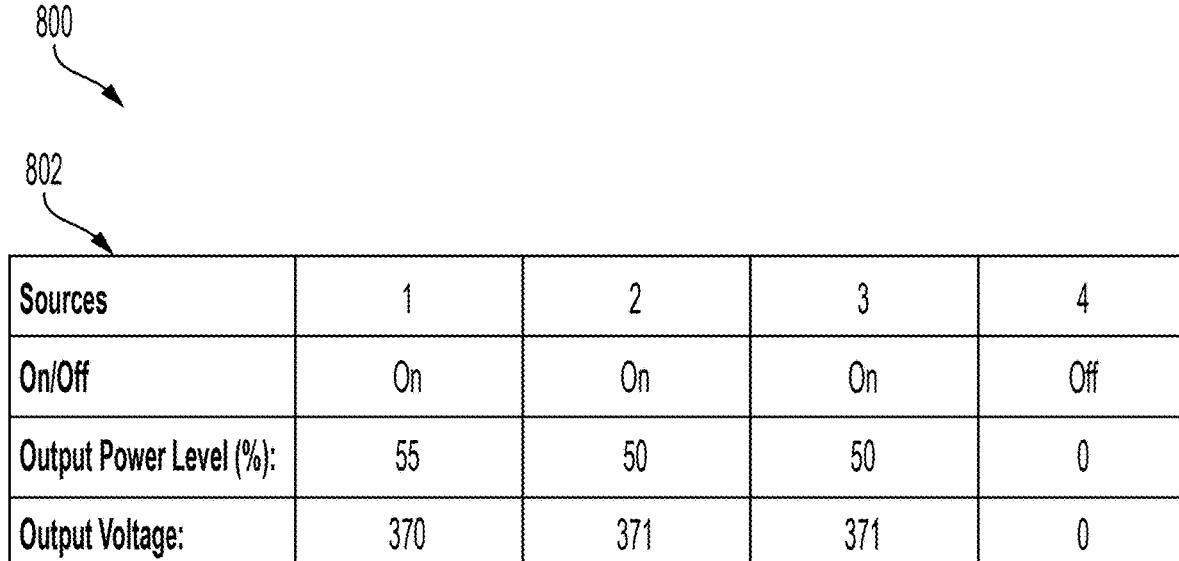
FIG. 8 illustrates a set of tables according to an example.

FIG. 8 illustrates a set of tables 800 ("tables 800") including a first table 802 and a second table 804. The first table 802 has the same rows (Sources, On/Off, Output Power Leve, Output Voltage) as the first table 402 of FIG. 4, and the second table 804 has the same columns (Load, Load Utilization Level) as the second table 404 of FIG. 4. The sources and loads may also correspond to the same things in FIG. 2 as they do in FIG. 4.

According to the first table 802, power source 4 is off and has an output power level of 0% at 0V. Power sources 1-3 are on. According to the second table 804, each load is drawing power, but is at various utilization levels. For example, load A is at 65% utilization, load B is at 75% utilization, load C is at 80% utilization, load D is at 35% utilization, and loads E and F are at 25% utilization. As a result, the output power level of power source 1 is 55% at 370V, power source 2 is 50% at 371V, and power source 3 is 50% at 371V. This demonstrates that the power system (for example, power system 200 of FIG. 2) can balance the output power level across the loads even when the load utilization level for the loads varies between the loads.

Figure 9:
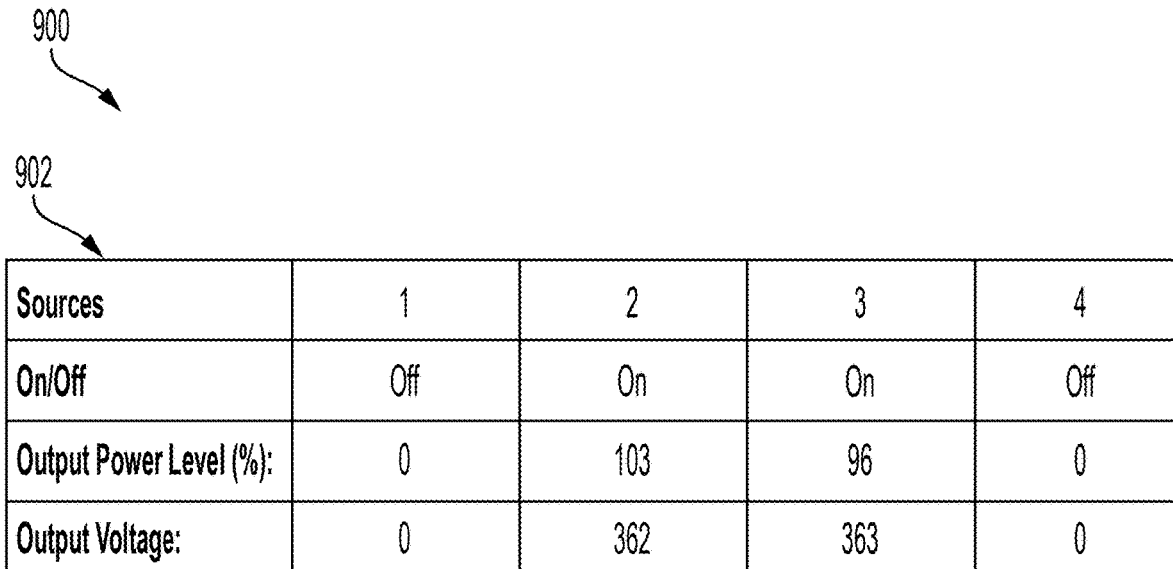
FIG. 9 illustrates a set of tables according to an example.

FIG. 9 illustrates a set of tables 900 ("tables 900") including a first table 902 and a second table 904. The first table 902 has the same rows (Sources, On/Off, Output Power Leve, Output Voltage) as the first table 402 of FIG. 4, and the second table 904 has the same columns (Load, Load Utilization Level) as the second table 404 of FIG. 4. The sources and loads may also correspond to the same things in FIG. 2 as they do in FIG. 4.

According to the first table 902, power sources 1 and 4 are off and have an output power level of 0% at 0V. According to the second table 904, load C is off (but would otherwise be at 90% load utilization if it were on), loads A and B, D, and E are on and at 90% load utilization, and load F is at 25% utilization. As a result, the loading on the power sources 2 and 3 that remain on is unbalanced as load C is off and power sources 1 and 4 are unavailable to provide power. Nevertheless, the power system 200 can balance the output power level as much as possible. As a result, power source 2 has an output power level of 103% at 362V, and power source 3 has an output power level of 96% at 363V. This demonstrates that, even when multiple power sources are offline, the power system (for example, power system 200) can still provide power to most of the loads, and will still provide balanced power to those loads which are powered. In this example, the only load that is not powered (load C, which corresponds to the third rack 214 of the power system 200) is not powered because both power converters to which the third rack 214 is coupled (the first and fourth power converters 202, 208) are offline. If the third rack 214 were coupled to another power source, it could, in some examples, still receive power, and the power provided by the power sources could remain balanced.

Taken together, FIGS. 4-9 demonstrate that the power system 200 of FIG. 2 and/or the power system 100 of FIG. 1 can automatically balance the output power level between power sources (for example, power inverters or power converters) through the use of the droop controllers, asymmetric conducting devices and the redundant power topology of the power system 200 and/or power system 100, regardless of load status (for example, on or off) or load utilization level, and regardless of power source status (for example, on or off). FIGS. 4-9 further demonstrate that the power system 200 and/or power system 100 is able to withstand power source (e.g., power converter) disconnection without impact to the loads in most situations, and may continue to provide balanced power from the connected and/or active power sources in most situations.

Figure 10:
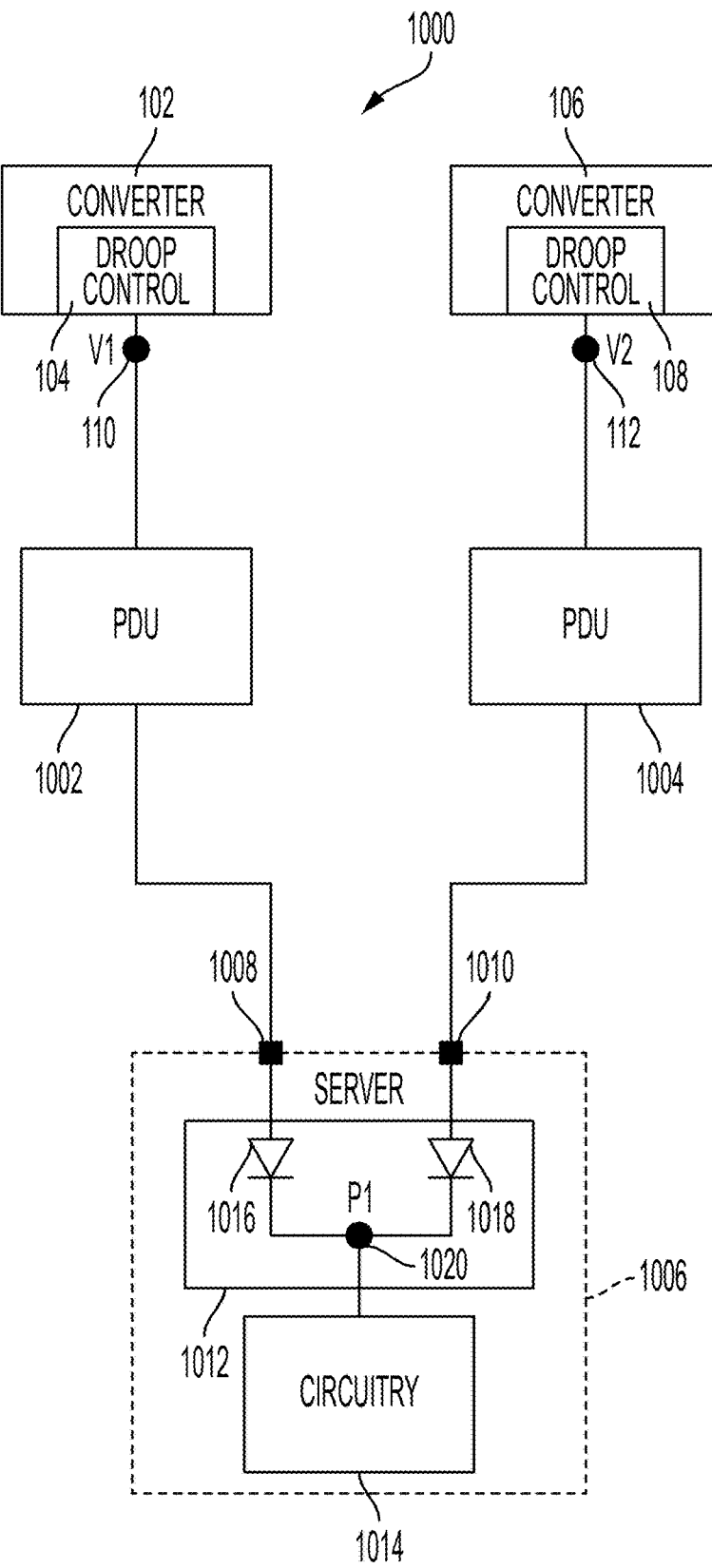
FIG. 10 illustrates a power system according to an example.

FIG. 10 illustrates a power system 1000 according to an example. The power system 1000 includes the first converter 102, the first droop controller 104, the second converter 106, the second droop controller 108, the first node 110, and the second node 112 from FIG. 1. Furthermore, the power system 1000 includes a first PDU 1002, a second PDU 1004, a server 1006, a first input 1008, a second input 1010, a power supply unit 1012 ("PSU 1012") server circuitry 1014, a first asymmetric conducting device 1016 ("first diode 1016"), a second asymmetric conducting device 1018 ("second diode 1018"), and a third node 1020.

The first node 110 is coupled to an input of the first PDU 1002. The second node 112 is coupled to an input of the second PDU 1004. An output of the first PDU 1002 is coupled to the first input 1008. An output of the second PDU 1004 is coupled to the second input 1010. The first input 1008 is coupled to the first diode 1016 of the PSU 1012. In some examples, the first input 1008 is coupled to an anode of the first diode 1016. The second input 1010 is coupled to the second diode 1018 of the PSU 1012. In some examples, the second input 1010 is coupled to an anode of the second diode 1018. The first and second diodes 1016, 1018 are coupled to the third node 1020 of the PSU 1012. In some examples, respective cathodes of the first and second diodes 1016, 1018 are coupled to the third node 1020. The third node 1020 may be coupled to the server circuitry 1014 of the server 1006.

The power system 1000 is generally similar to the power system 100 of FIG. 1, except that the converters 102, 106 are coupled to respective PDUs 1002, 1004, and the diodes 1016, 1018 are incorporated into the power supply, PSU 1012, of the server 1006. The server circuitry 1014 of the server 1006 may be configured to carry out operations of the server (e.g., run applications, programs, communications, and so forth, of the server 1006). In some examples, the PDUs 1002, 1004 may be coupled to multiple servers and/or multiple racks containing one or more servers. In some examples, the converters 102, 106 may be, respectively, coupled to more than one PDU. For example, the first and second nodes 110, 112 may each be coupled to more than one PDU.

Figure 11:
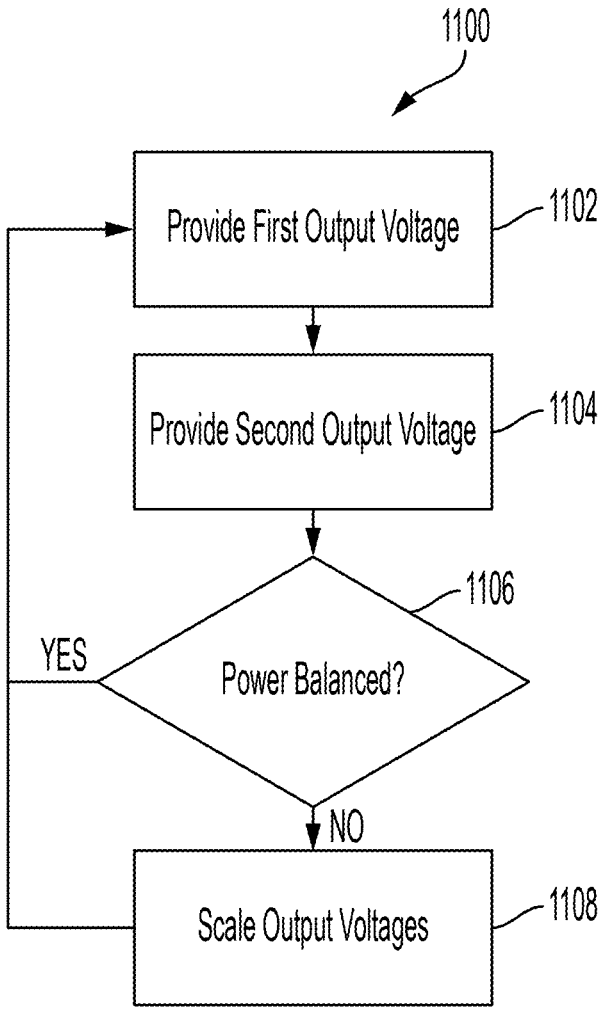
FIG. 11 illustrates a process for providing balanced power according to an example.

FIG. 11 illustrates a process 1100, for balancing power in a power system, according to an example.

At act 1102, a first power source provides a first output voltage to one or more loads. A first droop controller may control the level of the first output voltage. The process 1100 then continues to act 1104.

At act 1104, a second power source provides a second output voltage to one or more loads, including at least one of the loads to which the first output voltage is provided. A second droop controller may control the level of the second output voltage. The process 1100 then continues to act 1106.

At act 1106, the first droop controller and/or the second droop controller detect the output power level of their respective power sources. The first droop controller and/or second droop controller may adjust the respective output voltages of the respective power sources based on the respective output power level of the first power source and the second power source. In some examples, the droop controllers may detect or receive a signal indicating the output power level of the respective power source to which the droop controller is coupled. In some examples, act 1106 may be a passive function, where the droop controllers do not make an affirmative determination of whether the power provided by the power sources is balanced, but instead receive indications of the output power levels and then, as described with respect to act 1108, automatically adjust the output voltages. If the power is balanced (1106 YES), the process 1100 may return to act 1102 and repeat the process 1100. If the power is not balanced (1106 NO), the process 1100 may continue to act 1108.

At act 1108, the first droop controller may scale the first output voltage based on the first output power level of the first power source, and/or the second droop controller may scale the second output voltage based on the second output power level of the second power source. Each droop controller may scale the respective output voltages using a droop characteristic curve, such as shown in FIG. 3. In some examples, the droop controllers may reduce the respective output voltages as respective output power levels increase, and may increase the respective output voltages as respective output power levels decrease. The droop controllers may continue to adjust the output voltage until the output power levels for the first and second power sources are equal or approximately equal (for example, within +/−5% of each other). The process 1100 may then return to act 1102.

As described above, the droop controllers may adjust the output voltages of the power sources (for example, converters) automatically. The adjusting of the output voltages based on output power levels may automatically balance the output power levels as the output power levels may depend on the output voltages, and the output voltages may depend on the output power levels.

Figure 12:
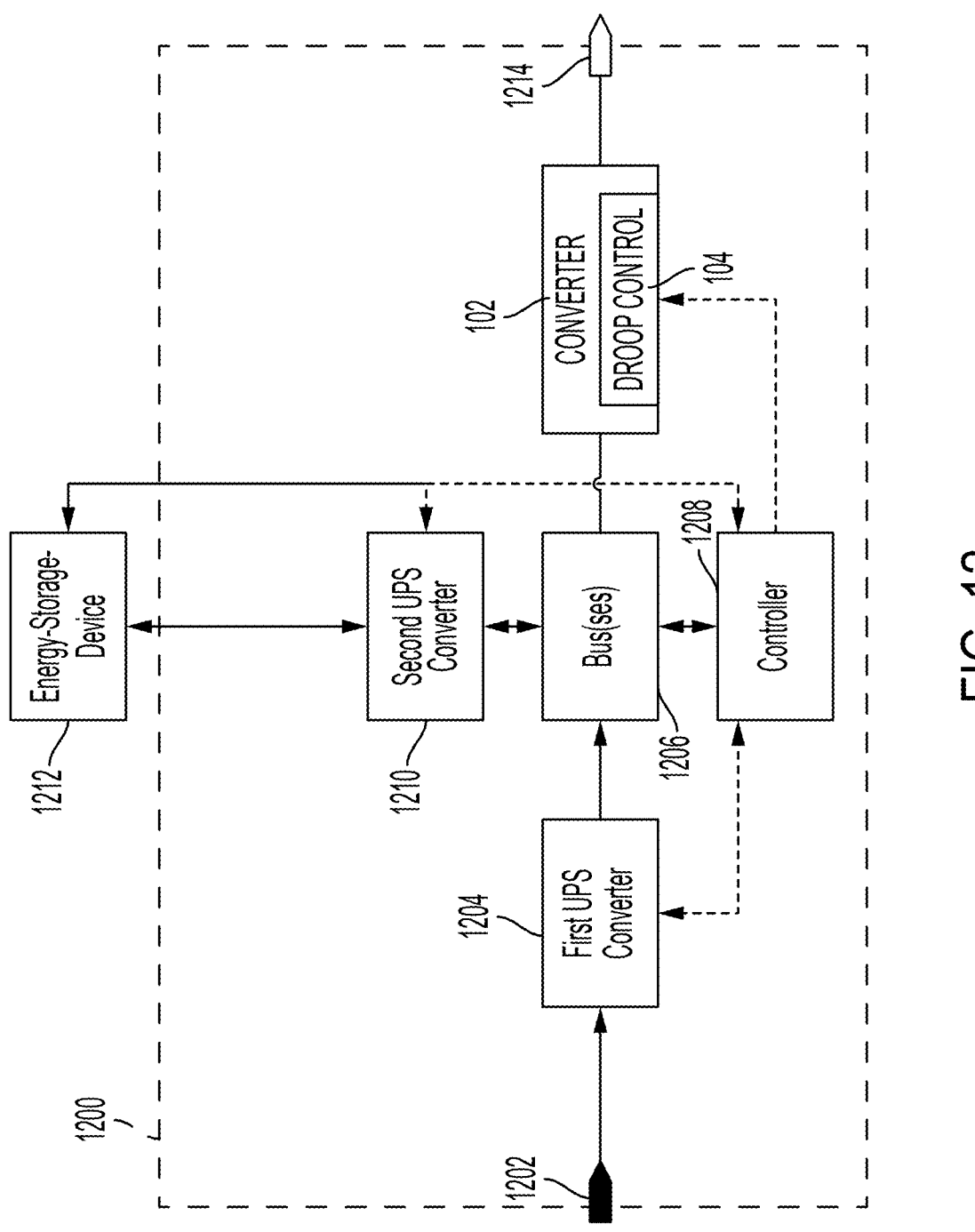
FIG. 12 illustrates a power system according to an example.

The converters, such as the first converter 102, may be incorporated into uninterruptible power supply systems ("UPS systems"). FIG. 12 illustrates a UPS system 1200 according to an example. The UPS system 1200 includes an uninterruptible power supply 1200 ("UPS 1200"), input 1202, first UPS converter 1204, one or more internal busses 1206, at least one controller 1208 ("controller 1208"), a second UPS converter 1210, the first converter 102 and first droop controller 104, an energy-storage device 1212 ("battery 1212") and an output 1214.

The input 1202 is coupled to the first UPS converter 1204. The first UPS converter 1204 is coupled to the internal busses 1206. The internal busses 1206 are coupled to the controller 1208, the first converter 102, and the second UPS converter 1210. The second UPS converter 1210 is coupled to the battery 1212. The first converter 102 is coupled to the output 1214. The controller 1208 is coupled to the first UPS converter 1204, the second UPS converter 1210, and/or the first converter 102 and/or first droop controller 104.

The input 1202 is configured to receive input power, for example, from a utility or mains line, a generator, or other power source. The input 1202 may receive input power that is AC or DC power, but in some examples will be AC power. The first UPS converter 1204 is configured to receive the input power and process the first input power. In some examples, the first UPS converter 1204 may be an AC/DC converter, a DC/AC converter, an AC/AC converter, and/or a DC/DC converter, but in some examples will be an AC/DC converter. The first UPS converter 1204 is configured to provide the processed first input power to the internal busses 1206. The internal busses 1206 are configured to route the processed input power to the controller 1208, first converter 102, and/or second UPS converter 1210.

The second UPS converter 1210 may be an AC/DC converter, DC/AC converter, AC/AC converter, and/or DC/DC converter, but in some examples the second UPS converter 1210 will be a DC/DC converter. The second UPS converter 1210 is configured to receive the processed input power from the internal busses 1206, to further process the processed input power to make it acceptable for storage in the battery 1212, and then to provide the processed input power to the battery 1212. The second UPS converter 1210 is also configured to receive stored power from the battery 1212 and to process the stored power and provide the processed stored power to the internal busses 1206. The battery 1212 is configured to store power and to provide stored power to the second UPS converter 1210.

The first converter 102 and first droop controller 104 may function as described above, and may draw processed input power and/or processed stored power from the internal busses 1206. The first converter 102 may be a DC/DC converter, and/or an AC/DC converter, but in some examples will be a DC/DC converter.

The controller 1208 is configured to control the first UPS converter 1204, second UPS converter 1210, and/or first converter 102 and/or first droop controller 104. The controller 1204 may control the processing performed by the first and/or second UPS converter 1204, 1210. The controller 1208 may also control the droop characteristic curve of the droop controller 104 and the processing performed by the first converter 102.

Figure 13:
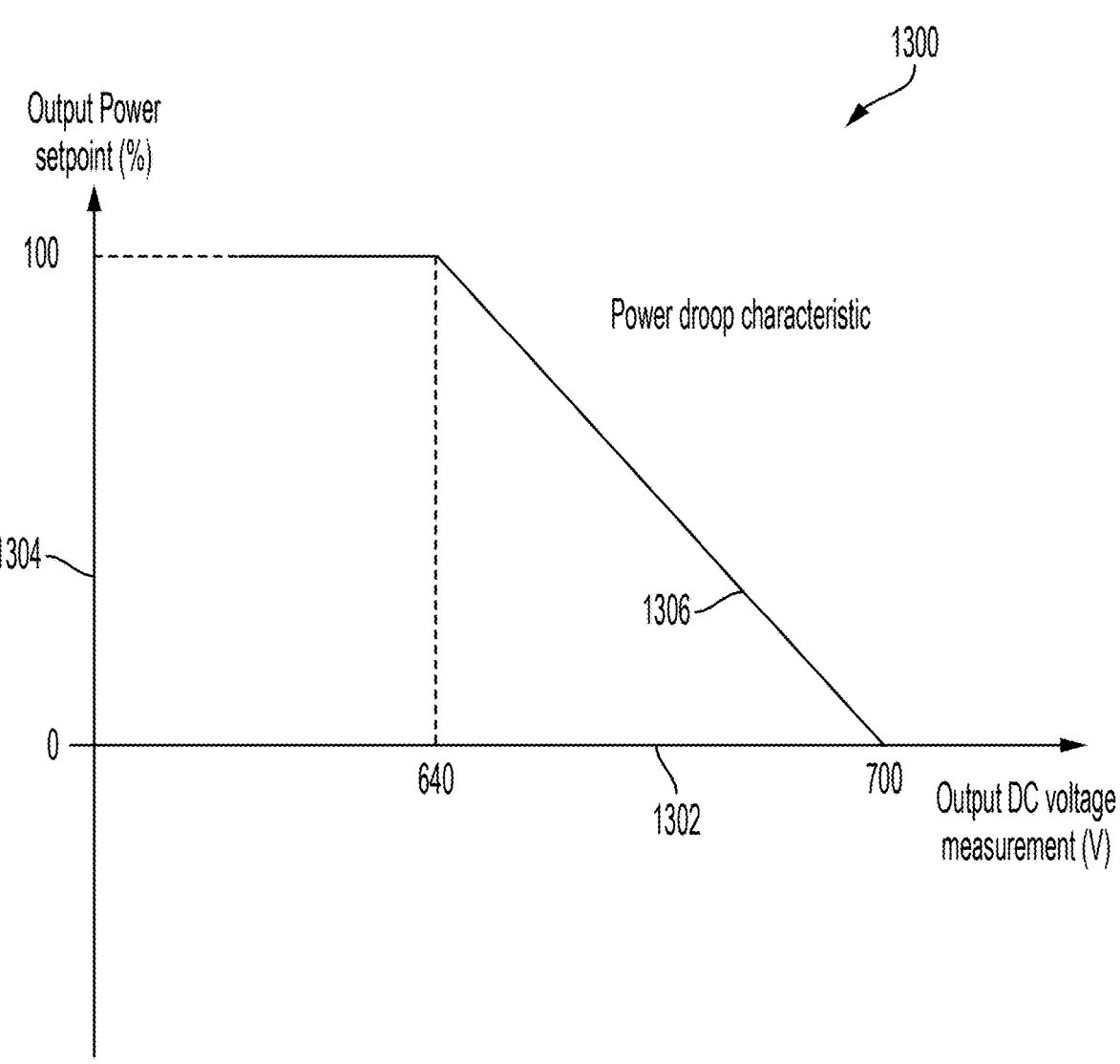
FIG. 13 illustrates a graph according to an example.

FIG. 13 illustrates a graph 1300 of a power droop (or reverse droop) mode of controlling power output levels according to an example. Power or reverse droop is an alternative method of regulating the output voltage and/or power of a power converter. As a result, any of the droop controllers discussed herein may implement power droop in lieu of or in addition to voltage droop. The graph 1300 includes a first axis 1302 illustrating the output voltage in volts, a second axis 1304 indicating the output power of a given power converter as a percentage, and a trace 1306 illustrating the droop characteristic curve for power droop.

The graph 1300 illustrates that at voltages below a set threshold voltage (in this case, 640V), the droop controller may control the converter to output at 100% power. As the output DC voltage increases, the output power percentage falls to 0%. For example, the trace 1306 is linear and monotonically decreasing between 640V and 700V. At 640V (or less), the output power percentage is 100%, at 700V (or more), the output power percentage is 0%. The halfway point between 640V and 700V is 670V, therefore the output power would be at 50% at 670V. At 646V, the output power would be at 90% (because 646V is 10% of the way from 640V to 700V). Likewise, at 694V the output power would be at 10% (because 694V is 10% of the way from 700V to 640V). In this particular example, the difference between 700V and 640V is 60V, and thus every 6V change between 640V and 700V indicates a 10% change in the output power level since the power droop characteristic curve is linear. However, the power droop characteristic curve need not be linear, and in some examples, may be nonlinear (e.g., a step-function).

As mentioned above, the droop controllers of the power converters may use voltage droop and/or power droop. When using power droop, a droop controller may receive a signal indicating the output voltage of the power converter, and may adjust the output power percentage (e.g., the output power level) of the power converter based on the output voltage. This mirrors, but is not the same, as the voltage droop controllers discussed above which adjust the output power voltage based on the output power percentage (e.g., the output power level).

In the examples discussed with respect to at least FIGS. 4-9, the Load Utilization Levels, Output Power Levels, and Output Voltages may be approximations within +/−5% of the actual value used in tests and simulations.

In examples discussed herein, power converters may be part of uninterruptable power supply (UPS) systems designed to provide uninterruptible power to one or more loads.

In examples discussed herein, an instance of a single rack in a description may instead be read to mean a plurality of racks connected in parallel with one another relative to a power source, such as a converter. For example, in FIG. 2, each of the displayed racks 210, 212, 214, 216, 218, 220 may represent a single rack and/or a plurality of racks connected in parallel with one another relative to their respective power sources. For the purposes of clarity, the term "subrack" used herein may refer to a single rack and the term "rack" used herein may refer to a single rack and/or a plurality of racks connected in parallel as described above.

Examples of the methods and systems discussed herein are not limited in application to the details of construction and the arrangement of components set forth in the description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Various controllers, such as the controller 1208 and/or droop controllers 104, 108, may execute various operations discussed above. Using data stored in associated memory and/or storage, the controller 1208 and/or droop controllers 104, 108 also executes one or more instructions stored on one or more non-transitory computer-readable media, which the controller 1208 and/or droop controllers 104, 108 may include and/or be coupled to, that may result in manipulated data. In some examples, the controller 1208 and/or droop controllers 104, 108 may include one or more processors or other types of controllers. In one example, the controller 1208 and/or droop controllers 104, 108 is or includes at least one processor. In another example, the controller 1208 and/or droop controllers 104, 108 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power system for a data center, the power system comprising:

a first rack having a first rack first input and a first rack second input;

a second rack having a second rack first input and a second rack second input;

a third rack having a third rack first input and a third rack second input;

a first power converter coupled to the first rack first input and the second rack first input, the first power converter being configured to provide a first portion of first DC power to the first rack and a second portion of the first DC power to the second rack, the first power converter being configured to adjust a first output voltage of the first power converter based at least in part on the first DC power, wherein the first power converter is not coupled to the third rack;

a second power converter coupled to the first rack second input and the third rack first input, the second power converter being configured to provide a first portion of second DC power to the first rack and a second portion of the second DC power to the third rack, the second power converter being configured to adjust a second output voltage of the second power converter based at least in part on the second DC power, wherein the second power converter is not coupled to the second rack;

a first asymmetric-conductance device coupled between the first power converter and the first rack;

a second asymmetric-conductance device coupled between the second power converter and the first rack.

2. The power system of claim 1 further comprising a first droop controller coupled to the first power converter and a second droop controller coupled to the second power converter.

3. The power system of claim 2 wherein the first droop controller is configured to control the first power converter to adjust the first output voltage based at least in part on the first DC power.

4. The power system of claim 2 wherein the first droop controller is configured to control the first power converter to adjust the first DC power based on the first output voltage.

5. The power system of claim 2 wherein the first droop controller is configured to control the first power converter to reduce the first output voltage as the first DC power increases and to increase the first output voltage as the first DC power decreases.

6. The power system of claim 2 wherein the second droop controller is configured to control the second power converter to adjust the second output voltage based at least in part on the second DC power.

7. The power system of claim 6 wherein the second droop controller is configured to control the second power converter to adjust the second DC power based on the second output voltage.

8. The power system of claim 7 further comprising:

a third power converter coupled to the second rack second input and third rack second input, the third power converter configured to provide a first portion of third DC power to the second rack and a second portion of the third DC power to the third rack, the third power converter being configured to adjust a third output voltage of the third power converter based at least in part on the third DC power, wherein the third power converter is not coupled to the first rack;

a fifth asymmetric-conductance device coupled between the third power converter and the second rack; and a fourth asymmetric-conductance device coupled between the third power converter and the third rack.

9. The power system of claim 8 wherein the third power converter includes a third droop controller configured to control the third power converter to reduce the third output voltage as the third DC power increases and to increase the third output voltage as the third DC power decreases.

10. The power system of claim 8 further comprising:

one or more non-transitory computer-readable media containing thereon instructions for instructing one or more droop controllers, the instructions instructing:

the first droop controller to control the first DC power converter to output the first output voltage, determine the first DC power associated with the first output voltage, and responsive to the first DC power increasing, decreasing the first output voltage;

the second droop controller to control the second DC power converter to output the second output voltage, determine the second DC power associated with the second voltage, and responsive to the second DC power increasing, decreasing the second output voltage.

11. The power system of claim 10 wherein the instructions further instruct a third droop controller to control the third DC power converter to output the third output voltage, determine the third DC power associated with the third voltage, and responsive to the third DC power increasing, decreasing the third output voltage.

12. The power system of claim 6 wherein the second droop controller is configured to control the second power converter to reduce the second output voltage as the second DC power increases and to increase the second output voltage as the second DC power decreases.

13. The power system of claim 1 further comprising:

a third asymmetric-conductance device coupled between the first power converter and the second rack; and a fourth asymmetric-conductance device coupled between the second power converter and the third rack.

14. The power system of claim 1 wherein each of the first rack and second includes a plurality of subracks coupled in parallel with one another relative to a power converter.

* * * * *